United States Patent [19]

Sato et al.

[11] 4,155,848

[45] May 22, 1979

[54] WET OXIDATION OF WASTES WITH CIRCULATION

[75] Inventors: Atsushi Sato; Isoo Shimizu; Tsutomu Miyamoto, all of Yokohama; Katsufumi Suga, Tokyo, all of Japan

[73] Assignee: Nippon Petrochemicals Co., Ltd., Tokyo, Japan

[21] Appl. No.: 808,856

[22] Filed: Jun. 22, 1977

[30] Foreign Application Priority Data

Jun. 25, 1976 [JP] Japan .................................. 51-74508

[51] Int. Cl.$^2$ ............................................... C02B 1/34
[52] U.S. Cl. ................................... 210/60; 210/63 R; 210/71; 162/31; 162/36
[58] Field of Search ............... 210/175, 177, 178, 194, 210/197, 198 R, 205, 220, 60, 63 R, 71; 261/29, 121 R, 122, 124; 48/206, 213; 162/31, 36

[56] References Cited

U.S. PATENT DOCUMENTS

| | | | |
|---|---|---|---|
| 2,404,701 | 7/1946 | Felsecleer | 210/197 |
| 3,359,200 | 9/1966 | Gitchel | 210/63 R |
| 3,529,725 | 9/1970 | Fifer | 210/220 |
| 3,649,534 | 3/1972 | Schotte | 210/71 |
| 3,759,669 | 9/1973 | Aaron et al. | 208/213 |
| 3,788,476 | 1/1974 | Othmer | 210/194 |
| 3,807,564 | 4/1974 | Hess et al. | 210/177 |
| 3,808,126 | 4/1974 | Pradt | 210/63 R |
| 3,817,856 | 6/1974 | Aaron et al. | 208/213 |
| 3,826,739 | 7/1974 | Kubo | 210/63 R |
| 3,914,756 | 7/1965 | Walker | 210/220 |
| 3,926,807 | 12/1975 | Evers | 210/177 |
| 3,942,958 | 3/1976 | Thompson | 48/213 |

OTHER PUBLICATIONS

Perry's Chemical Engineering Handbook, 4th Edition, McGraw Hill, N.Y., 1969, 4-24 and 4-25.

*Primary Examiner*—Charles N. Hart
*Assistant Examiner*—Ernest G. Therkorn
*Attorney, Agent, or Firm*—Frank J. Jordan

[57] ABSTRACT

A process for wet oxidation of a liquid waste effluent using a vertical-type pressure-proof container in which a free space is provided at each of the axial lower and upper ends and the remaining space between the axial ends is divided into at least two spaces, at least one serving as an effluent-descending space and the other as an effluent-ascending space, by furnishing at least one partition, which process comprising introducing a liquid waste effluent and circulating the effluent through the effluent-descending space, lower free space, effluent-ascending space and upper free space while oxidizing the effluent with an oxidizing gas ejected upward into the effluent-ascending space and withdrawing the oxidized effluent and used oxidizing gas through an outlet provided at the top of the container.

7 Claims, 18 Drawing Figures

WET OXIDATION OF WASTES WITH CIRCULATION

This invention relates to a process for wet oxidation. More particularly, it relates to a process for wet oxidation of oxygen demanding substances to such an extent that the substances so oxidized are permitted to be discharged under the environmental pollution prevention regulations.

As a process for oxidizing oxygen demanding substances (hereinafter referred to as "COD substances") dissolved or suspended in community liquid waste and liquid waste effluents resulting from factory or mill operations, there has heretofore been known a process for contacting such liquid waste and effluents (such liquid waste and effluents being hereinafter referred to simply as "effluents" for brevity) with air or other oxidizing gases under the conditions that the effluents are heated to an elevated temperature under a pressure sufficient to maintain them in liquid phase at this elevated temperature. This process was published in Japanese Patent Gazette No. 4560/52 and issued as Japanese Pat. No. 198003 and it is well known as the Zimmermann Process.

Conventional wet oxidation processes are necessary to be carried out at very high temperatures such as 170°–330° C. and at very high pressures such as 20–150 Kg/cm$^2$. Effluents to be treated are highly corrosive in many cases and may often contain substances which, when the effluents are heated, will produce sludges and cause polymerization and condensation reactions thereby clogging a heating device by which the effluents are heated. The conventional processes are therefore inconvenient to treat such effluents. Thus, to avoid such inconveniences, various improved processes and apparatuses have been proposed. These conventional improved processes and apparatus are intended to prevent the clogging of a heating device of the apparatus before effluents have been heated to the temperature at which the oxidizing reaction starts and they are also intended to effect efficent gas-liquid contact thereby to increase a COD oxidation rate.

Typical of the conventional improved processes are:

1. A process comprising preventing polymerization by blowing in air upstream of a heat exchanger (Japanese Patent Application Laying-Open Gazette No. 101265/74)

2. A process for cleaning a heat exchanger (Japanese Patent Application Laying-Open Gazette No. 54269/74)

3. A process for heating waste water with steam separated from high-temperature wet oxidized waste water (Japanese Patent Application Laying-Open Gazette No. 15371/72)

4. A process for heating by a heat exchanger and a mixed heating tank (Japanese Patent Application Publication Gazette No. 1403/60)

5. A process for heating with condensed steam entrained with high-temperature waste gases (Japanese Patent Application Publication Gazette No. 18179/74)

It is expected that the use of these conventional improved processes will be effective in preventing the clogging of heating devices; however, they need heat exchangers, flush towers, gas-liquid separators and other complicated utilities to carry out any one of such processes. Particularly, there will be needed heating devices for heating corrosive effluents in many cases as well as devices for the after treatment of the treated effluents. Since devices included in the conventional improved apparatus are structurally complicated and required to be pressure-proof and corrosion-resistant, there will be raised problems as to not only the material composing the devices but also the operation and maintenance thereof.

Typical apparatuses which are intended to solve problems as to the gas-liquid contact, are as follows:

1. An apparatus comprising a reactor having multilayer metal nets therein (Japanese Patent Application Laying-Open Gazette No. 9244/75)

2. An apparatus comprising batch-type reactors connected in series (Japanese Patent Application Laying-Open Gazette No. 3590/75)

3. An apparatus comprising a reactor in which two-step oxidation is effected (Japanese Patent Application Publication Gazette No. 3590/75)

However, such reactors used in wet oxidation treatment at high temperatures and pressures are structurally complicated, and if they have movable portions then it will be difficult to keep them in good operational condition. In addition, it is not expected that such apparatuses will be sufficiently effective particularly in disposing of effluents, such as sewage sludges, containing a large amount of incombustible solid particles, because of the structure of the apparatuses.

An object of this invention is to provide a process for wet oxidation of effluents containing COD substances, wherein the effluents are heated to the reaction-starting temperature without clogging of the apparatus and they are fully circulated and agitated in the reactor thereby to carry out effective gas-liquid contact. The effluents to be treated may contain BOD substances in addition to the COD substances.

Another object of this invention is to provide a process having an apparatus for wet oxidation of effluents, comprising a container which functions not only as a reactor but also as a heat exchanger thereby to circulate the effluents while allowing them to react substantially uniformly at every part in the container.

The wet oxidation process of this invention using a vertical-type pressure-proof container fitted therein with at least one longitudinal partition extending axially of the container and having a length smaller than the axial length of the inside of the container, the partition being positioned so that a free space is present between the upper end of the partition and the upper inner end of the container and between the lower end of the partition and the lower inner end of the container while the remaining longitudinal space between the upper and lower free space is divided into at least two longitudinal spaces by the partition in the container, at least one divided longitudinal space serving as an effluent-descending space and the other as an effluent-ascending space, comprising the steps of:

introducing a liquid waste effluent at a level lower than the upper end of the partition into at least one effluent-descending space, passing the effluent downward to the lower free space, turning the effluent via the lower free space to the effluent-ascending space in which an oxidizing gas inlet is positioned at a level higher than the lower end of the partition, passing the effluent through the effluent-ascending space while accelerating it upward to effect efficient gas-liquid contact for wet oxidation by the rising force of the oxidizing gas ejected through the gas inlet, and turning the effluent via the upper free space to the effluent-descending space, thereby circulating the effluent while withdrawing the oxidation treated effluent and the used oxidizing gas from the container through an outlet provided at the top thereof and, as required, repeating this cycle. The term "oxidation treated effluent" and "oxidized effluent" used herein have the same meaning and they are intended to mean "oxidation treated effluent and gases, such as $CO_2$, produced by the oxidation". In this process, steam for heating the effluent may be ejected preferably near the lower end or in the inside of the effluent-ascending space, if desired.

The apparatus for wet oxidation of the process of this invention comprises:

a vertical-type pressure-proof container, at least one longitudinal partition extending axially of the container and having a length smaller than the axial length of the inside of the container, the partition being positioned so that a free space is present between the upper end of the partition and the upper inner end of the container and between the lower end of the partition and the lower inner end of the container while the remaining longitudinal space between the upper and lower free spaces is divided into at least two longitudinal spaces by the partition in the container, at least one divided longitudinal space serving as an effluent-descending space and the other as an effluent-ascending space, an inlet for introducing therethrough a liquid waste effluent into the effluent-descending space, the inlet being positioned in the effluent-descending space at a level lower than the upper end of the partition, an inlet for supplying therethrough an oxidizing gas into the effluent-ascending space, the inlet being positioned in the effluent-ascending space at a level high than the lower end of the partition and an outlet for withdrawing therethrough the oxidized effluent and the used oxidizing gas, the liquid waste effluent being introduced into the at least one effluent-descending space, passed downward to the lower free space, turned via the lower free space to the effluent-ascending space while being accelerated upward to effect efficient gas-liquid contact for wet oxidation by the rising force of the oxidizing gas ejected upward through the gas inlet (if desired at this point, incorporated with steam for heating the effluent) and turned via the upper free space to the effluent-descending space, thereby circulating the effluent while withdrawing the oxidized effluent and used oxidizing gas from the container through an outlet provided at the top thereof. This cycle may be repeated, as required.

This invention will be better understood by reference to the accompanying drawings in which.

Figure 1:
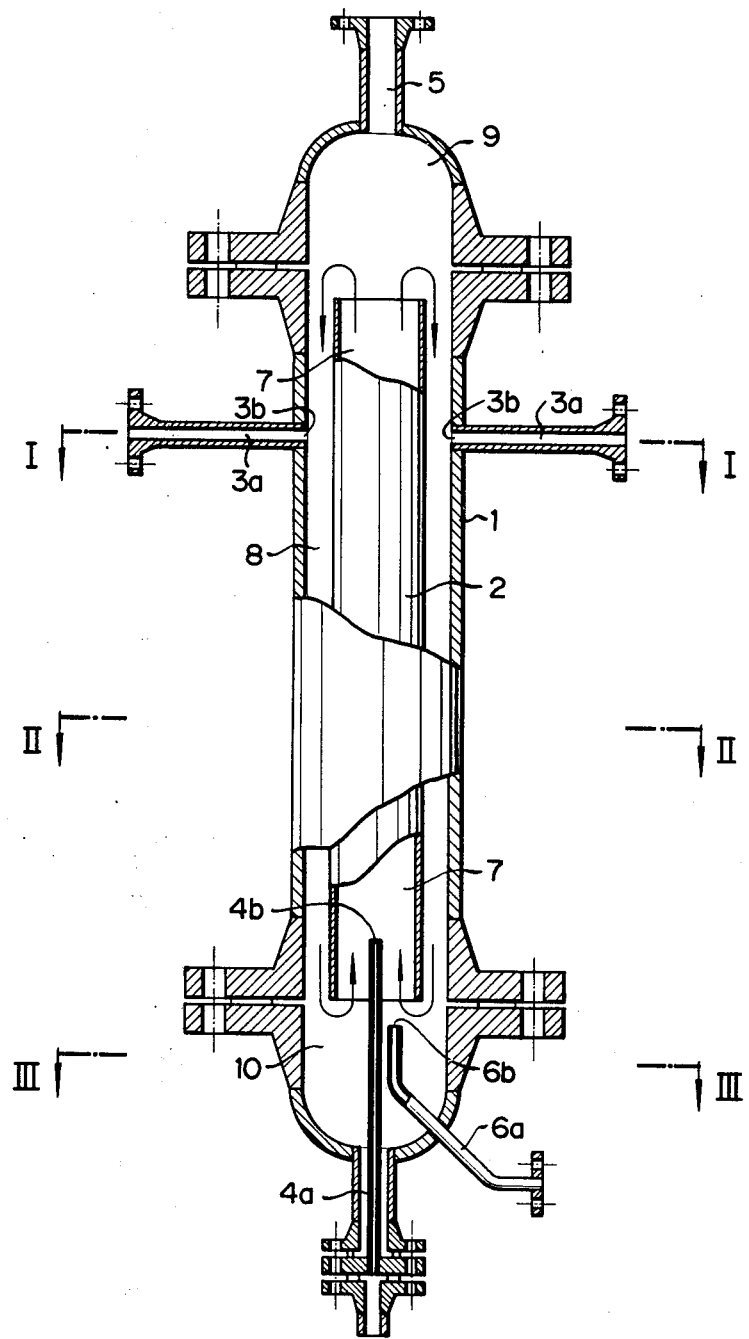
FIG. 1 is an elevation, partly exploded, of a vertical-type pressure-proof container embodying this invention, in which a single cyclinder is used as a partition.
Figure 2:
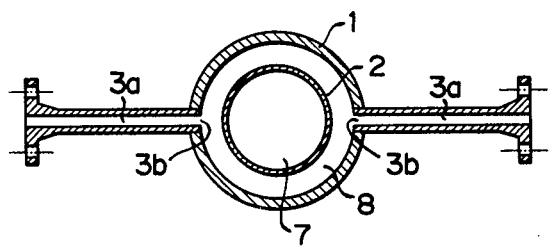
FIGS. 2 to 4 are cross-sectional views taken along the lines I—I, II—II and III—III of FIG. 1, respectively.
Figure 3:
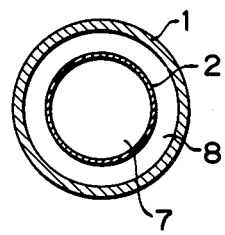
Figure 4:
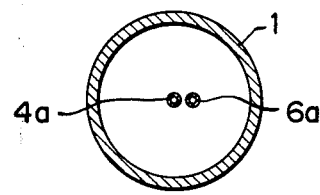

Referring now to FIGS. 1–4, numeral 1 indicates a vertical-type pressure-proof container (hereinafter referred to as "outer cylinder") and a cylindrical partition (hereinafter referred to as "inner cylinder") 2 is coaxially fitted in the container 1, thus constituting free spaces 9 and 10 respectively at the upper and lower portions of the inside of the container 1. The inner cylinder is easily supported by the outer cylinder by means of any conventional method using, for example, brackets and welding (not shown). A pipe 3a with an inlet 3b for introducing therethrough a liquid waste effluent is connected to the container 1 so that the inlet 3b is positioned at the upper portion of the outer cylinder and at a level lower than the upper end of the inner cylinder. A pipe 4a with an inlet 4b for supplying therethrough an oxidizing gas such as air, is sealably inserted through the lower end of the outer cylinder so that the inlet 4b is positioned in the inner cylinder at a level higher than the lower end thereof. A pipe 5 for withdrawing therethrough the oxidation treated effluent and used oxidizing gas is connected to the top of the outer cylinder. If desired, a pipe 6a with an inlet 6b for supplying therethrough steam for heating the effluent is connected to the lower portion of the outer cylinder so that the inlet 6b is positioned preferably somewhat below the inner cylinder.

Since the oxidizing reaction is carried out at a high temperature and pressure and the effluent to be treated is corrosive, the outer cylinder must be pressure-proof in structure and made of corrosion resistant material while the inner cylinder must be made of corrosion resistant material but need not be pressure-proof because of its presence as the partition in the outer cylinder.

To ensure the circulation of the effluent, the effluent inlet 3 should be positioned sufficiently lower than the upper end of the inner cylinder and at the same time the oxidizing gas inlet should be positioned sufficiently higher than the lower end of the inner cylinder.

The position of the oxidizing gas inlet in the inner cylinder should be determined such that the portion of the inner cylinder lower than the gas inlet serves as a guide plate to ensure the oxidizing gas jet effect by which the ascending streams of the circulating effluent is straightened up or placed in order.

In the upper free space 9 and its neighborhood, a complicated turbulence is produced by not only a part of the oxidized effluent and used oxidizing gas directed from the inside of the inner cylinder toward the outlet at the top of the container but also the effluent directed for circulation from the inside of the inner cylinder via the upper free space toward the space between inner and outer cylinders. Thus, if the effluent inlet 3 be provided at the neighborhood of the upper end of the inner cylinder, then a part of an effluent introduced through the effluent inlet 3 will be reversed to the outlet 5 for withdrawal thereby failing to attain the purpose of wet oxidation. To prevent the introduced untreated effluent from being reversed to the outlet 5, the effluent inlet 3 should be positioned sufficiently lower than the upper end of the inner cylinder (that is, the partition), thus ensuring the circulation of the effluent downward through the space between the inner and outer cylinders.

The wet oxidation of the effluent using the aforesaid apparatus of FIG. 1 is carried out as follows.

The effluent in the container or reactor is circulated in such a manner that the effluent in the inner cylinder is passed upward through the inside 7 thereof (the inside 7 being hereinafter referred to as "effluent-ascending space") and then passed downward through the space 8 between the inner and outer cylinders (the space 8 being hereinafter referred to as "effluent-descending space"), by the driving or rising force produced from the jet effect of air ejected through the oxidizing gas inlet 4 and from an apparent difference in specific gravity between the effluent in the ascending space 7 and that in the descending space 8. By said circulation, the effluent in the reactor results in being agitated to an extent that the composition thereof is substantially the same at every part of the reactor.

A liquid waste effluent is charged, without pre-heating, into the effluent-descending space 8 through the effluent inlet 3 and passed downward through the space 8 while being in heat exchange with the circulated effluent heated to a high temperature by the exothermic oxidation reaction thereby to be heated to a temperature at which the oxidation reaction starts. The charged effluent so heated is successively passed upward through the effluent-ascending space 7 while it is contacted with air for wet oxidation, and a part of the oxidized effluent is withdrawn through the outlet 5 and the remainder is passed downward through the effluent-descending space for recycle. Since the recycled effluent is accompanied with a portion of the air in small bubble form and, in addition, it contains oxygen dissolved therein, a further oxidizing reaction takes place in the effluent-descending space.

Figure 9:
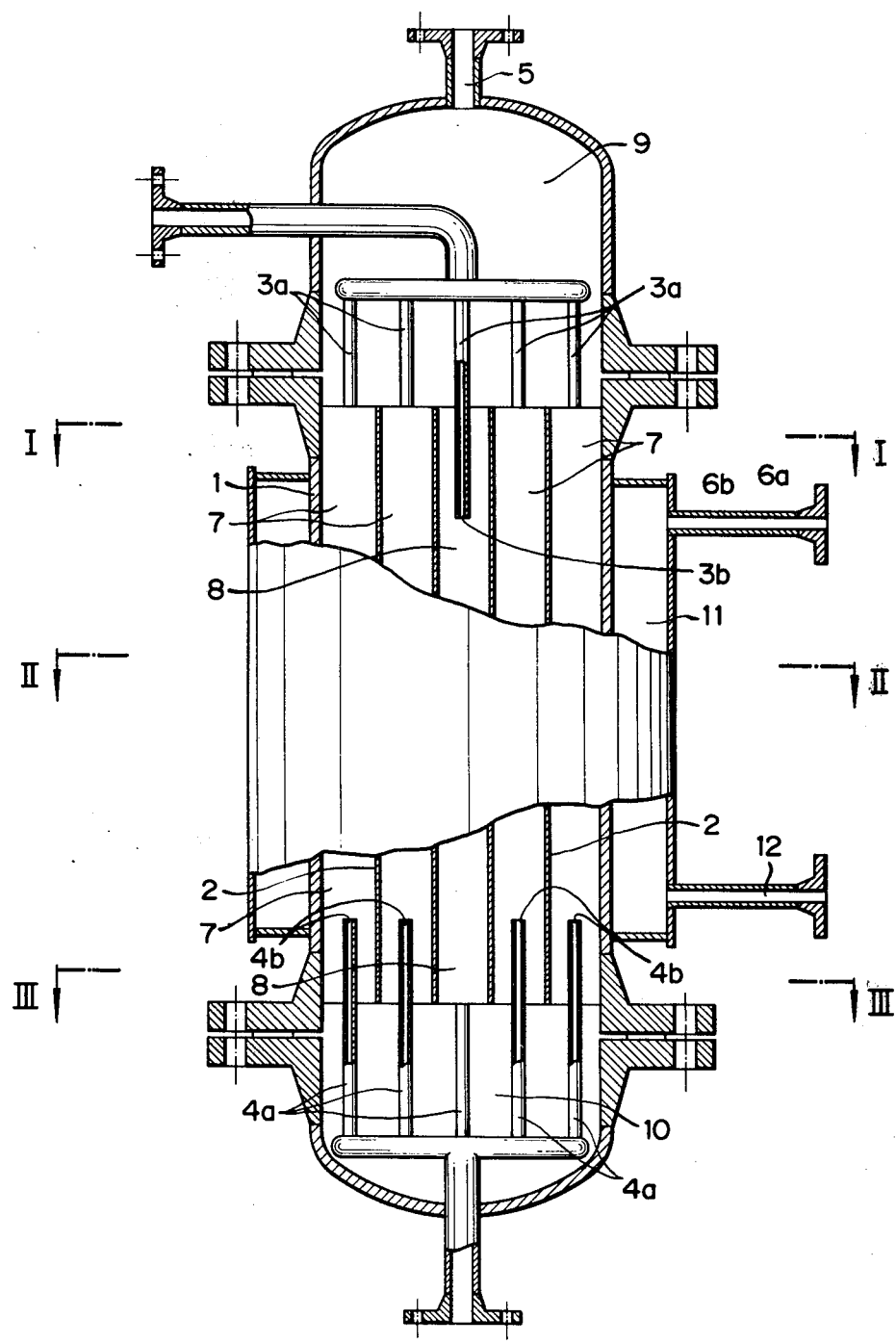
FIG. 9 is an elevation, partly exploded, of still another embodiment of a vertical-type pressure-proof container of this invention having therein a honeycomb-like partition.
Figure 10:
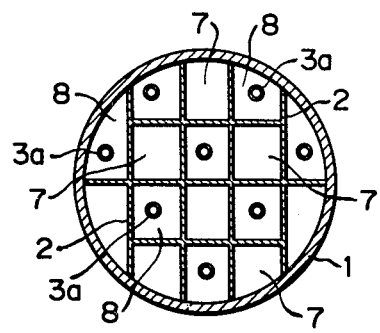
FIGS. 10–12 are cross-sectional views taken along the lines I—I, II—II and III—III of FIG. 9, respectively.
Figure 13:
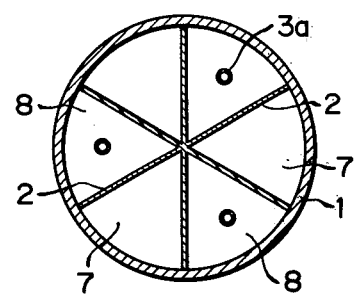
FIGS. 13–15 are cross-sectional views of further embodiments of a vertical-type pressure-proof container of this invention, in which embodiments the partitions are redial in cross-section, respectively.
Figure 11:
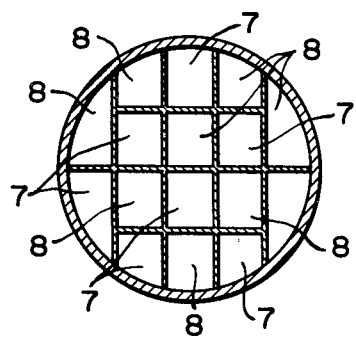
Figure 14:
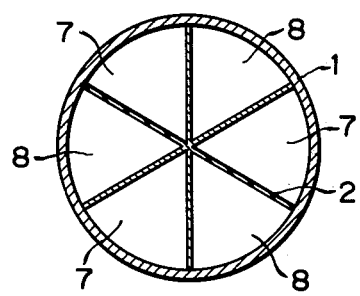
Figure 12:
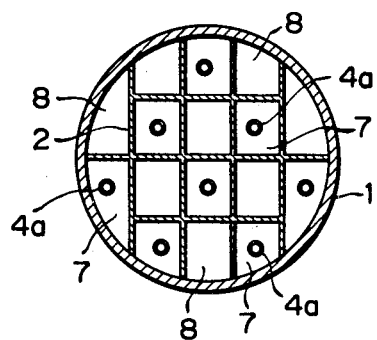
Figure 15:
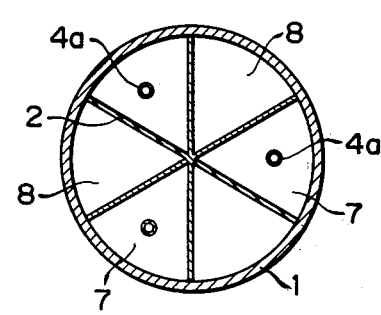

It is required that prior to starting the apparatus for wet oxidation, a liquid waste effluent introduced be heated to a temperature at which the COD substances contained in the effluent start to be oxidized. This heating is achieved by various methods including a method for supplying steam through the steam inlet 6 as shown in FIG. 1. Typical of other methods are a method using a heating jacket 11 provided around an outer cylinder as indicated in FIG. 9 and a method for supplying steam together with air through the air inlet 4.

If the amount of heat produced by the oxidation in the effluent-ascending space is too small because of too low a concentration of the COD substances contained in an effluent to be treated, such too small heat may not heat the effluent introduced without pre-heating, to a temperature at which the effluent starts to be oxidized. In this case, the aforesaid heating means may be used for supplementing the shortage of heat.

In the practice of this invention, it is necessary to effect a better circulation of the effluent through the effluent-ascending space and then the effluent-descending space in order to ensure a desirable oxidation and heat exchange. To this end, it is important to select the differential pressure of air at the air inlet, the ratio of cross-sectional area between the effluent-ascending space and the effluent-descending space, and the amount of air supplied.

It is the jet effect obtained by air ejected through the air inlet that plays an important role as a power source for circulating the effluent, and it is more desirable if the velocity of air ejected through the nozzle of the air inlet is higher. The differential pressure of air at the nozzle should be at least 0.5 $Kg/cm^2$ and is not particularly limitative in its upper limit; the higher the differential pressure is, the better the effluent is circulated, resulting in better gas-liquid contact. However, it is not advantageous that the use of an unduly high differential pressure will impose a great load on an air compressor used. A differential pressure of 15 $Kg/cm^2$ is practically a preferable upper limit, but it is not limitative in this invention.

It is expected that the COD substances in the effluent are oxidized by the oxygen contained in fine air particles (bubbles) accompanying the circulating effluent and the oxygen dissolved therein even in the effluent-descending space. However, it may practically be considered that mainly the oxidation is effected by gas-liquid contact in the effluent-ascending space and mainly a direct heat exchange is effected between an effluent introduced and the circulating effluent in the effluent-descending space. It is therefore important to select the ratio of cross-sectional area between the effluent-ascending and effluent-descending spaces in order to effect both the oxidation and heat exchange efficiently. If the effluent-descending space is suitably narrow (suitably small in cross-section), then the effluent will descend at an increased linear velocity, accompanied with the air in comparatively large particle (bubble) form, thereby having a favorable effect on the oxidizing reaction in the effluent-descending space. On the other hand, if the effluent-descending space is unduly narrow, then the flow resistance will be increased, the amount of effluent circulated decreased and the efficiency of heat exchange lowered thereby making it difficult to heat the introduced effluent to a temperature at which it starts its oxidation, resulting in preventing the oxidizing reaction from continuing.

If the effluent-ascending space is unduly narrow, then fine air particles produced by the ejection of air through the air inlet will coalesce thereby to decrease the gas-liquid contact area necessary for oxidation of the COD substances in the effluent, resulting in preventing the oxidizing reaction from continuing. Thus, it is preferable that the ratio of cross-sectional area between the effluent-ascending and effluent-descending spaces be in the range of from 3.5:1 to 1:3 in the efficient practice of this invention. The amount of air supplied is also important in circulating the effluent and carrying out the gas-liquid contact effectively.

If the amount of air supplied is unsuitably small then the jet effect of air ejected will not be expected, while if it is unsuitably large then the effluent will ascend at a remarkably increased linear velocity thereby shortening the gas-liquid contact time and consequently preventing the oxidizing reaction from proceeding fully in the effluent-ascending space in which the greater part of the COD substances in the effluent are oxidized. Thus, the amount of air supplied is preferably 1.5 to 10 times the theoretical amount necessary for oxidation of the COD substances in the effluent, that is, 5.3 to 35 l of air per g/l of COD.

The temperature at which the effluent is treated may suitably be selected depending on COD substance contained in the effluent, and it may preferably be in the range of 150°–374° C. For example, if the COD substances are inorganic sulfur compounds such as sodium sulfide, a temperature of 150°–200° C. will be high enough to start a liquid-phase (or wet) oxidation of the COD substances; on the other hand, if they are organic COD substances, a temperature of 230° C. or higher is preferable for thorough oxidation thereof.

In any oxidizing treatment of COD substances, it is required that the reaction pressures be high enough to maintain the effluent in liquid phase at temperatures at which the oxidizing treatment is carried out.

Figure 18:
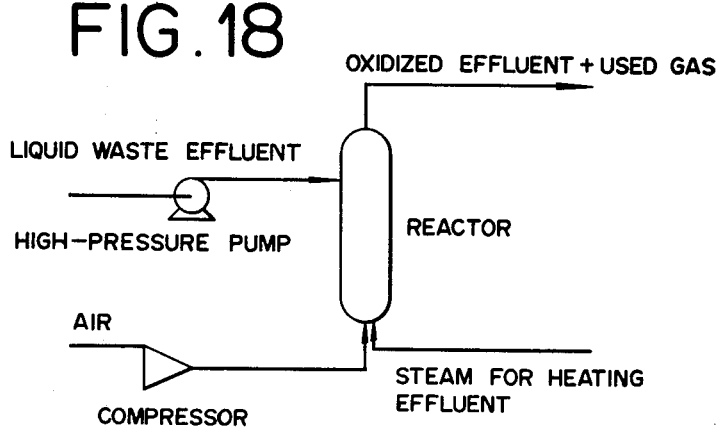
FIG. 18 is a flow chart of a process of this invention.

In the apparatus of this invention, the heating of an effluent introduced is effected by heat exchange with the effluent circulated in the reactor without the use of heat devices such as conventional heat exchangers, and the circulation of the effluent is effected by the jet effect of air ejected through the air inlet and does not need a specific driving machine for the circulation. FIG. 18 is a flow sheet of the apparatus and facilities attached thereto, and it does not utilize any high-pressure vessels other than the reactor.

If a liquid waste effluent contained substances which when heated by heat exchangers, are capable of clogging the heat exchangers by deposition of said substances on the heating surface thereof, is attempted to be treated according to this invention, local heating of the effluent will not be caused at all nor will sludges deposit on and attach to the inner surface of the reactor from the effluent since the liquid waste effluent to be treated is diluted with a large amount of the circulating effluent and heated by direct heat exchange therewith.

In addition, if a liquid waste effluent containing organic material which tends to polymerize when heated in the substantial absence of oxygen, is attempted to be treated with the apparatus of this invention, the unsaturated bonds of the organic matter will be cloven or the polymerizable organic molecules will be inactivated with the oxygen dissolved in the effluent or gaseous oxygen present therein when heated in the effluent-descending space, thereby making it possible to prevent the polymerization from taking place and avoid the clogging of the effluent-descending and effluent-ascending spaces. Typical of these polymerizable organic compounds are monomers such as acrylonitrile, butadiene and styrene as well as oxygen-containing compounds, such as phenol and aldehydes, which may be used as starting materials for polycondensation.

Another advantage of the liquid circulation oxidation system of this invention resides in that the fine air particles may be present in the circulating effluent without coalescing into larger air particles since air is blown into the circulating effluent ascending parallel with the blown air. On the other hand, if air is ejected into an effluent standing still or moving across the direction in which the air is ejected in an attempt to form fine air particles in the effluent, then air particles formed will sharply decrease in ascending velocity near the nozzle for ejecting the air since they depend for their ascending velocity only on the buoyancy of the air particles and ascend through the effluent having great viscous resistance, and the air particles will therefore have many chances to collide with subsequently formed air particles moving at a high ascending velocity obtained by the ejection, whereby the air particles so colloding with each other coalesce into larger air particles.

In contrast, if air is ejected into an effluent moving in the same direction as the air is ejected as in this invention, then fine air particles formed by the ejection of the air through nozzles will rapidly ascend in the effluent-ascending space thereby decreasing chances to collide with fine air particles subsequently formed by the ejection and therefore inhibiting the fine air particles from coalescing into larger air particles. In this manner, an efficient gas-liquid contact is achieved.

This invention has been described with reference to FIG. 1 which is a non-limitative embodiment of the apparatus of this invention.

Another embodiment of the apparatus of this invention is shown in FIGS. 5–8. The apparatus of this type comprises a plurality of inner cylinders 2 as the partitions, an oxidizing gas supply pipe 4a with a gas inlet 4b, the pipe 4a being positioned so that the gas inlet 4b is positioned in each inner cylinder somewhat above the lower end thereof, and a plurality of liquid waste effluent supply pipes 3a each having an effluent inlet 3b. The number of these components may suitably be selected. In addition, the inner cylinders shown in FIGS. 5 to 8 have a circular cross-sectional shape, but those having any other suitable shapes in cross-section may also be used as required.

Still another embodiment of the apparatus of this invention is shown in FIGS. 9–15. The apparatus of this type comprises a specifically shaped partition other than cylindrical partitions. The specifically shaped partitions include those of a honeycomb (FIGS. 10 to 12) or radial structure (FIGS. 13 to 15) in cross-section and they constitute many longitudinal spaces which may be used as effluent-ascending spaces 7 or effluent-descending spaces 8. In a case where the longitudinal space is used as the effluent-ascending space 7 then an oxidizing gas supply pipe 4a with a gas inlet 4b at the tip thereof is provided in the space 7 as shown in FIG. 9; on the other hand, in a case where the longitudinal space is used as the effluent-descending space 8 then a liquid waste effluent supply pipe 3a with an effluent inlet 3b at the tip thereof is provided in the space 8 as shown in FIG. 9.

Figure 5:
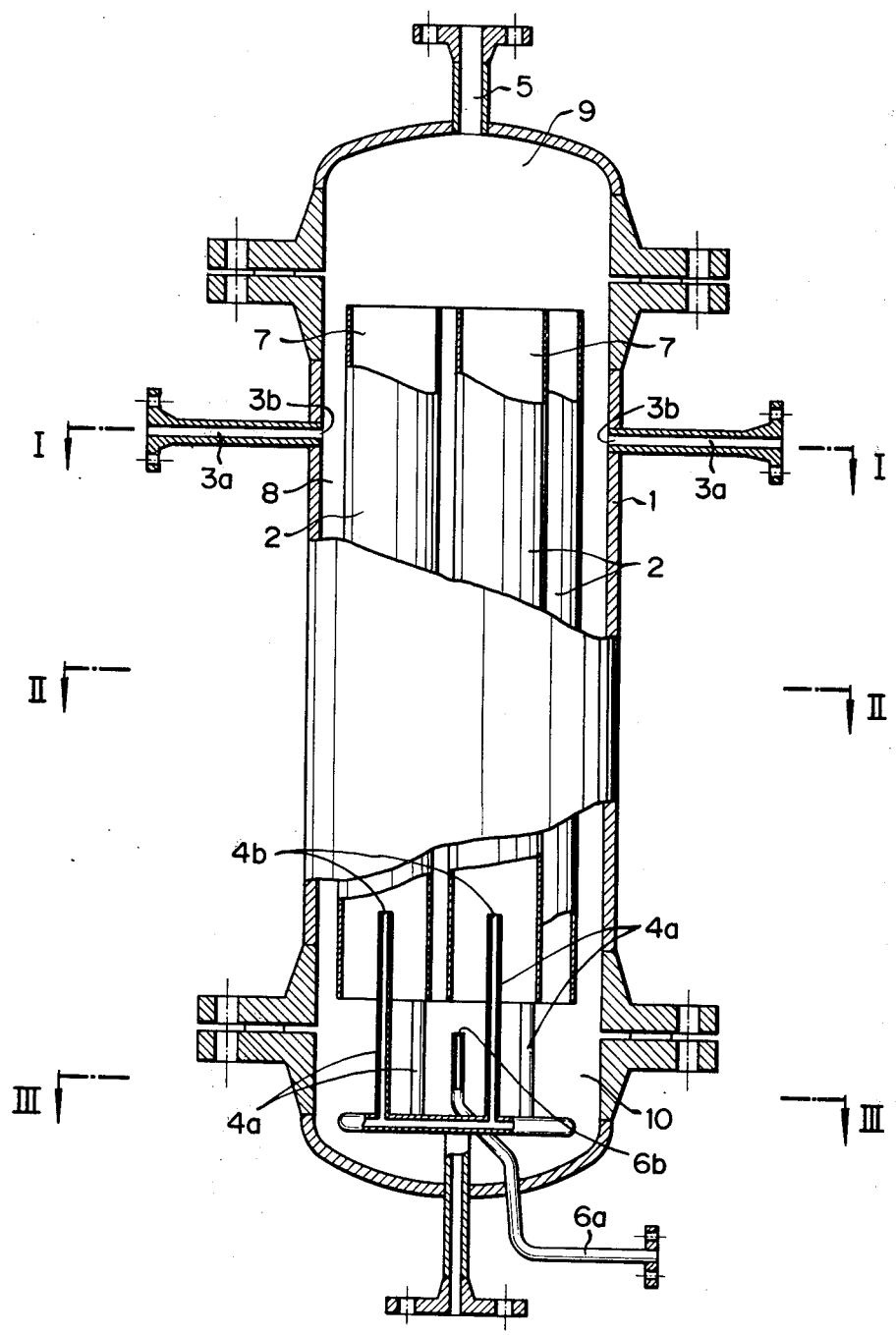
FIG. 5 is an elevation, partly exploded, of another embodiment of a vertical-type pressure-proof container of this invention having therein four cylinders as the partitions.
Figure 6:
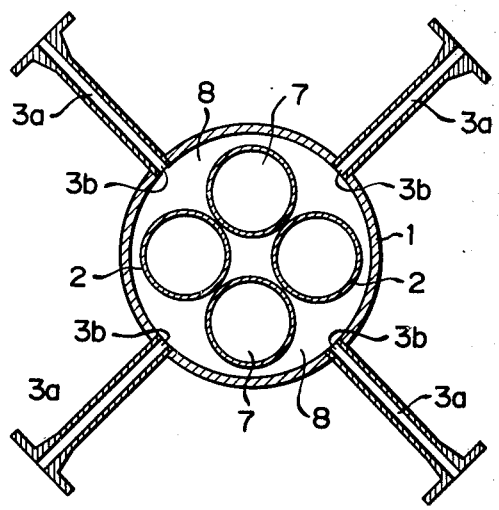
FIGS. 6–8 are cross-sectional views taken along the lines I—I, II—II and III—III of FIG. 5, respectively.
Figure 7:
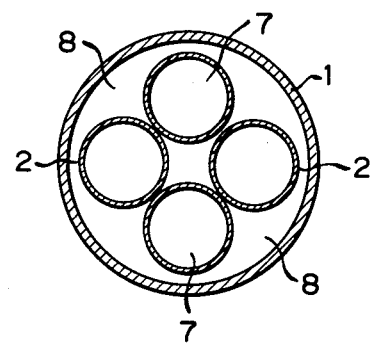
Figure 8:
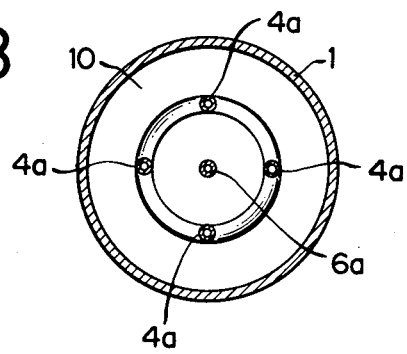

The apparatuses as shown in FIGS. 1, 5 and 9 may each be used for the effective conduct of the process of this invention. Those as shown in FIGS. 5 and 9 may preferably be used as an apparatus comprising a large-sized vertical-type pressure-proof container or reactor suitable for treating a large amount of a liquid waste effluent. In FIG. 9, a heating jacket 11 is illustrated as a means for heating the effluent, numeral 6 indicates a pipe for supplying a heating medium such as steam and numeral 12 indicates a pipe for dicharging the heating medium.

As is apparent from the foregoing description, the process and apparatus of this invention having a simple constitution and many other advantages find wide use as illustrated hereinbelow.

Liquid waste effluents which may be treated according to this invention, include organic COD substance (including BOD substance)—containing waste effluents such as spent sulfite liquor from paper-making and pulp-making factories, sewage sludges from sewage disposal plants, organic matter-containing liquid waste effluents from petroleum refineries, petrochemical factories and organic chemical factories, and waste water from dairies and other foodstuff factories and futher include inorganic COD substance (including BOD substance)—containing waste effluents such as coke furnace gas-desulfurization waste effluents containing ammonium thiocyanate, ammonium thiosulfate and free sulfur, soda-washing waste effluents containing sodium sulfide and sodium hydrosulfide, and alkali-washed exhaust gas desulfurization waste effluents.

This invention will be further detailed by reference to the following Examples in which all percentages are by weight unless otherwise specified.

EXAMPLES 1-5 (OXIDATION TREATMENT OF INORGANIC COD SUBSTANCES)

A $H_2S$-containing gas produced at the time of thermocracking a sulfur compound-containing naphtha, was washed with an aqueous solution of sodium hydroxide for desulfurization to obtain a brown-colored aqueous waste having offensive odor characteristic of hydrogen sulfide and containing 0.49% of NaOH, 6.56% of $Na_2S$ and 2000 ppm of unsaturated aldehydes. The aqueous waste so obtained was treated according to this invention.

The purpose for which the aqueous waste was subjected to oxidizing treatment in these Examples, resides in that the $Na_2S$, that is, an inorganic COD substance was oxidized to an extent that $Na_2S$ was converted to sodium sulfate thereby decreasing the COD of the liquid waste and simultaneously avoiding the odor arising from hydrogen sulfide which would otherwise be produced by the decomposition of the sodium sulfide.

The oxidizing reaction proceeded as indicated in the following reaction formula.

$$Na_2S + 2\ O_2 \rightarrow Na_2SO_4$$

If such oxidation is not fully proceeded, then the reaction product will contain sodium thiosulfate as the intermediate oxide together with the unreacted sodium sulfide.

The container or reactor used in those Examples had the same structure as that shown in FIG. 1 and was made of stainless steel SUS304(corresponding to U.S. AISI 304).
The size of the outer cylinder: 89.1 mm outer dia., 5.5 mm thick, 3 m long.
The size of the inner cylinder: 48.6 mm outer dia., 1.6 mm thick, 2.5 m long.
The inner volume of the reactor: 14
The reaction conditions: Temp. of liquid waste supplied, 35° C.; temp. of air supplied, 35° C.; temp. of liquid waste at the upper end of inner cylinder, 180° C.; pressure, 30 kg/cm²; and differential pressure at nozzle for ejecting air, 4 kg/cm².

After the end of oxidizing treatment, the aqueous wastes were cooled, subjected to gas separation and analyzed with the result being shown in Table 1. Each of the treated wastes was free of the offensive odor, light yellow-colored and transparent.

Table 1

| Example | Amount supplied | | Analysis for treated aqueous waste | | | Oxidation rate % |
|---|---|---|---|---|---|---|
| | Aqueous waste l/hr | Air Nm³/hr | $Na_2S$ ppm | $Na_2S_2O_3$ wt. % | $Na_2SO_4$ wt. % | |
| 1 | 15 | 9 | 0 | 0.00 | 12.61 | 100 |
| 2 | 15 | 7.5 | 0 | 0.00 | 12.28 | 100 |
| 3 | 15 | 6 | 0 | 0.09 | 12.26 | 99.3 |
| 4 | 30 | 18 | 30 | 0.12 | 10.55 | 99.0 |
| 5 | 30 | 12 | 30 | 0.40 | 10.20 | 96.7 |

In each of the Examples, no polymers were found in the treated aqueous waste and in the reactor.

EXAMPLE 6

Figure 16:
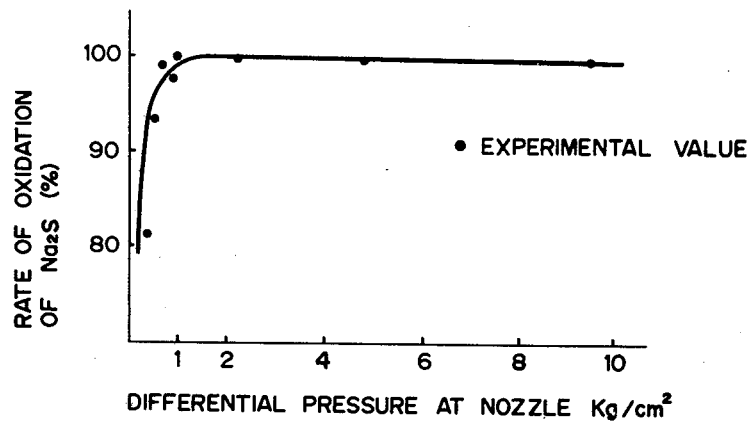
FIG. 16 is a graph showing a variation in oxidation rate with a change only in differential pressure of air at an air inlet.
Figure 17:
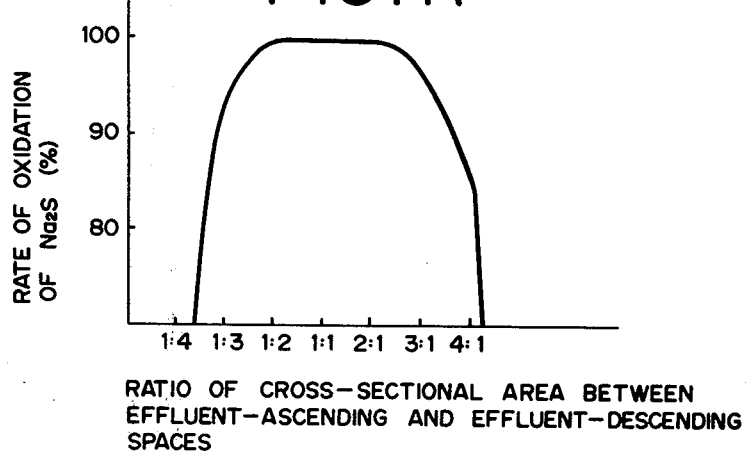
FIG. 17 is a graph showing a variation in oxidation rate with a change only in cross-sectional area of an inner tube as the partition.

Following the procedure of Example 1 but varying only the differential pressure, oxidation treatment experiments were made with the results being shown in FIG. 16. From this Figure it is apparent that the use of a differential pressure of at least 0.5 kg/cm² gave particularly desirable results.

EXAMPLE 7

Following the procedure of Example 1 but varying only the cross-sectional area of the inner cylinder, oxidation treating experiments were carried out with the results being shown in FIG. 18. As is apparent from this Figure, the selection of cross-sectional area ratios in the range of from 3.5:1 to 1:3 gave particularly desirable results.

EXAMPLE 8 (OXIDATION TREATMENT OF ORGANIC COD SUBSTANCES)

There was oxidation treated an aqueous waste which was black-brown in color with floating oily matter contained therein, had a COD value (Cr method in accordance with ASTM D 1252-67) of 55000 ppm and contained 1% of inorganic salts, the aqueous waste being discharged from the extracting step in an apparatus for the production of aromatics. The conditions under which the oxidation treatment was carried out, were that the amount of the aqueous waste used was 0.8 l/hr., the amount of air used 500 N l/hr., the remperature used at the upper end of the inner cylinder 260° C. and the pressure used 85 kg/cm². The reactor used was the same as used in Examples 1-5. The waste so treated was light yellow in color, transparent and free of offensive odor. It had a COD value of 240 ppm, this showing that the oxidation rate was 99.6%.

COMPARATIVE EXAMPLES 1-3

Following the procedure of Examples 1-3 but removing the inner cylinder from the reactor, oxidation treatment experiments were made. The aqueous waste so treated still had offensive odor characteristic of hydrogen sulfide and it was dark yellow-green in color and opaque. The results are shown in Table 2.

Table 2

| Comparative example | Amount supplied | | Analysis for treated aqueous waste | | | Oxidation rate % |
| --- | --- | --- | --- | --- | --- | --- |
| | Aqueous waste l/hr | Air Nm³/hr | $Na_2S$ wt.% | $Na_2S_2O_3$ wt.% | $Na_2SO_4$ wt.% | |
| 1 | 15 | 9 | 2.62 | 4.01 | 3.53 | 46 |
| 2 | 15 | 7.5 | 1.78 | 4.43 | 4.46 | 54 |
| 3 | 15 | 6 | 2.88 | 3.83 | 3.55 | 44 |

What is claimed is:

1. A process for wet oxidation of a liquid waste effluent using a vertical-type pressure-proof container fitted therein with at least one longitudinal partition extending axially of the container and having a length smaller than the axial length of the inside of the container, the partition being positioned so that a free space is present between the upper end of the partition and the upper inner end of the container and between the lower end of the partition and the lower inner end of the container while the remaining longitudinal space between said upper and lower free spaces is divided into at least two longitudinal spaces by the partition in the container, at least one divided longitudinal space serving as an effluent-descending space and the other as an effluent-ascending space, comprising the steps of:

providing a cross-section area ratio between the effluent-ascending space and the effluent-descending space in the range of from 3.5:1 to 1:3, introducing a liquid waste effluent containing organic material thermally polymerizable in the substantial absence of oxygen without preheating the effluent into at least one effluent-descending space at a level lower than the upper end of the partition, passing the effluent downward to said lower free space, turning the effluent via said lower free space to the effluent-ascending space, injecting an oxidizing gas upwardly into the effluent-ascending space by utilizing an oxidizing gas inlet positioned in the effluent-ascending space at a level higher than the lower end of the partition, supplying an amount of oxidizing gas at least 1.5 times the theoretical amount necessary for oxidation of the substances to be oxidized and at a differential pressure of at least 0.5 kg/cm², passing the effluent through the effluent-ascending space, utilizing the rising force of the injected oxidizing gas to accelerate the effluent upwardly through the effluent-ascending space and thereby effecting efficient gas-liquid contact for wet oxidation, turning the effluent via said upper free space to the effluent-descending space thereby circulating the effluent without polymerization of said polymerizable organic material and permitting the freshly introduced liquid waste effluent to be heated by the exothermic oxidation reation by direct contact with the circulated oxidized effluent in the effluent-descending space, and, withdrawing the oxidation treated effluent and the used oxidizing gas from the upper free space of the container through an outlet provided at the top thereof.

2. A process according to claim 1 further comprising passing at least some of the oxidizing gas downwardly in said effluent-descending space to effect a further oxidizing reaction in the effluent-descending space.

3. A process according to claim 1, wherein the partition is cylindrical in shape, the oxidizing gas is supplied into the cylindrical partition and the liquid waste effluent is supplied into the space between the cylindrical partition and the container wall.

4. A process according to claim 3, wherein the partition is a single cylinder positioned coaxially of the container, the inside of the single cylinder constituting the effluent-ascending space.

5. A process according to claim 3, wherein the partition consists of at least two cylinders, the inside of each of which constitutes the effluent-ascending space.

6. A process according to claim 1, wherein the effluent is heated for supplementing the shortage of heat necessary for wet oxidation of the effluent by an externally supplied heat medium.

7. A process according to claim 6, wherein the heat medium is steam.

* * * * *